UNITED STATES PATENT OFFICE.

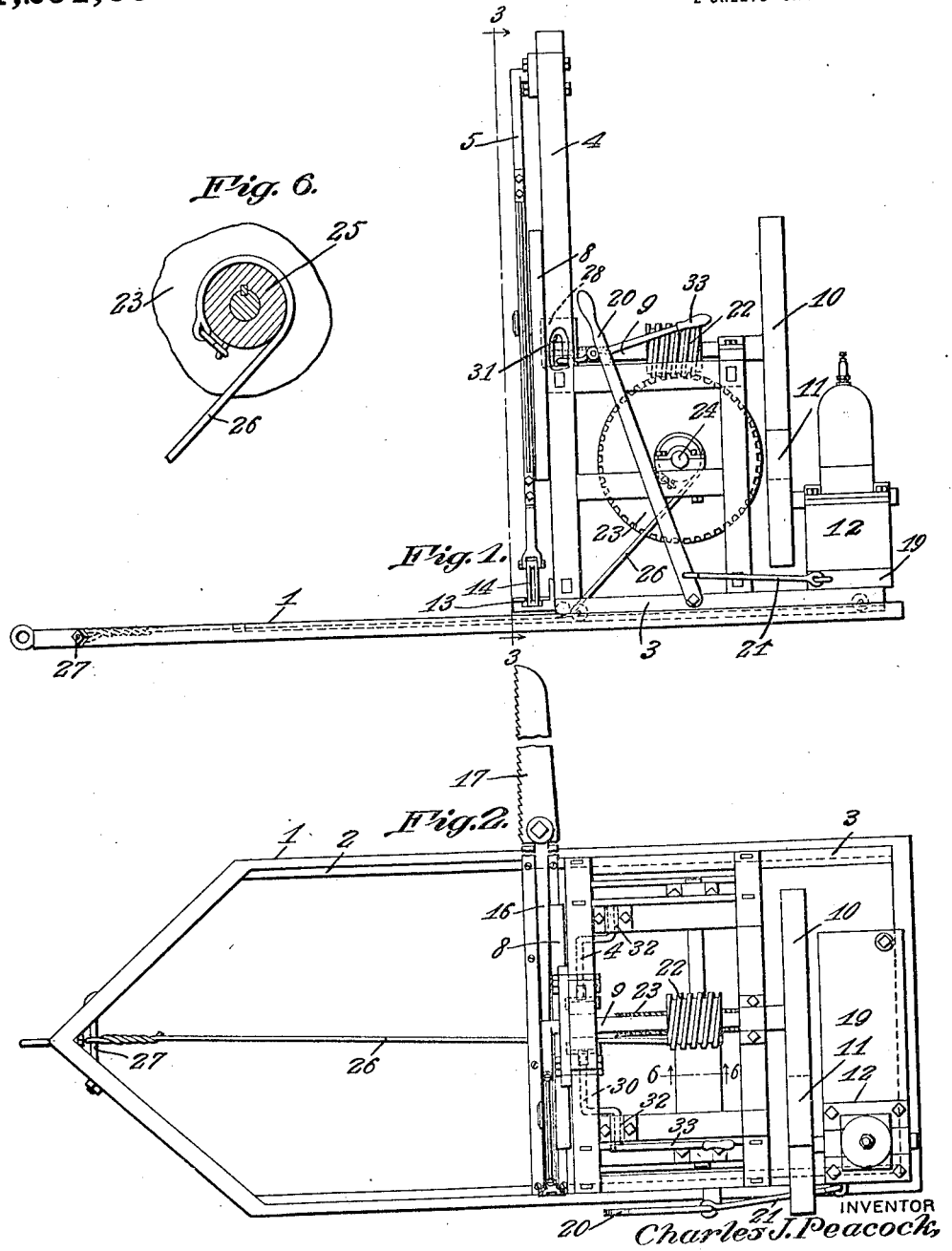

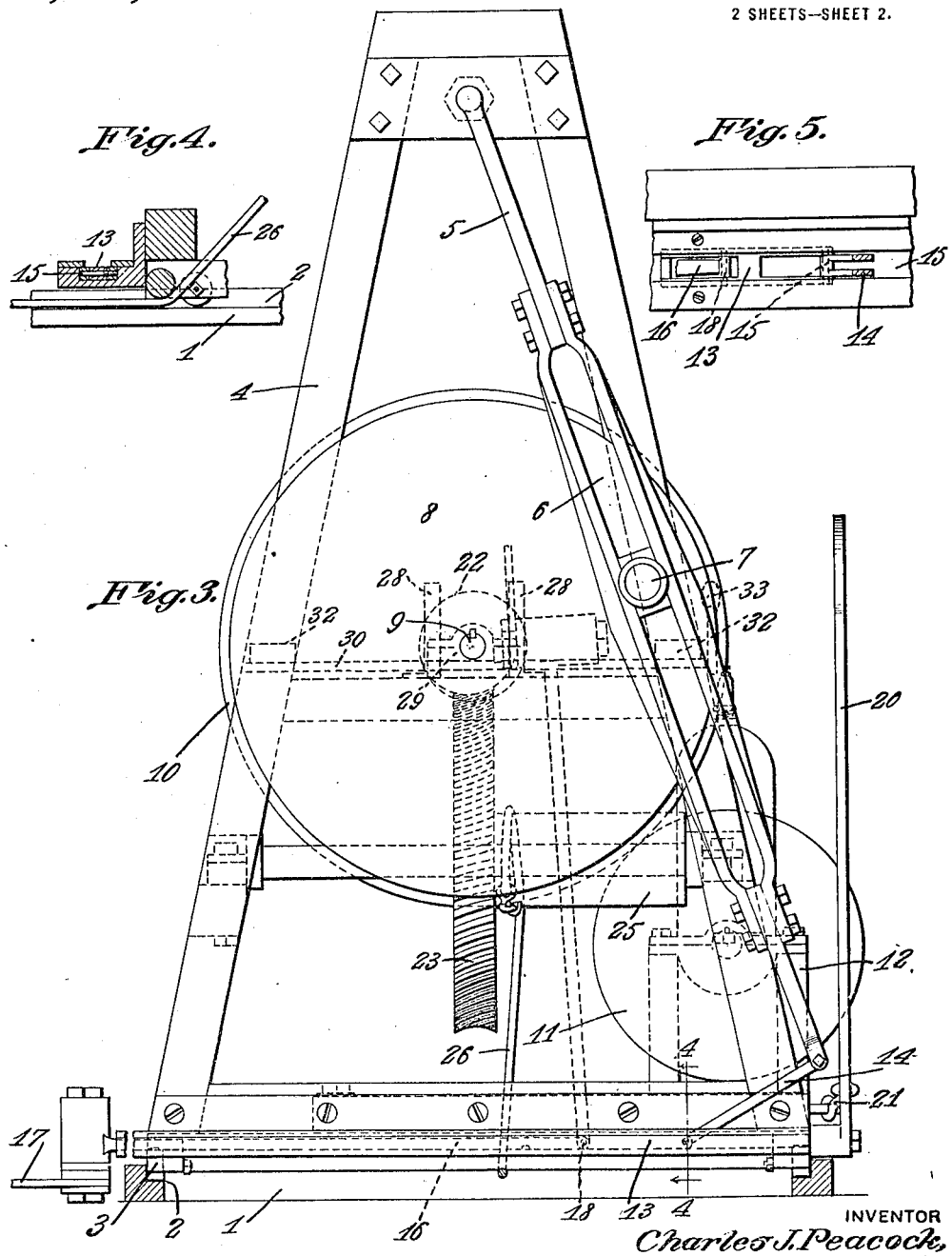

CHARLES J. PEACOCK, OF BEEDEVILLE, ARKANSAS.

STUMP-SAW.

1,291,630.  Specification of Letters Patent.  Patented Jan. 14, 1919.

Application filed March 21, 1917. Serial No. 156,452.

*To all whom it may concern:*

Be it known that I, CHARLES J. PEACOCK, a citizen of the United States, residing at Beedeville, in the county of Jackson and State of Arkansas, have invented certain new and useful Improvements in Stump-Saws, of which the following is a specification.

This invention relates to means for sawing stumps close to the ground. The object of the invention is to provide a device that will saw such stumps so close to the ground that they will not interfere with the cultivation of the ground, as the drills and binders will readily pass over the same.

A further object of the invention is to provide a device that can be easily carried from one stump to another so that a field can be cheaply cleared of stumps.

Another object of the invention is to locate the operating means above the saw, whereby the same can be readily mounted and actuated well above the ground.

Another object of my invention is to provide a device of this character which is simple and durable in construction, reliable and efficient in operation, and one which can be manufactured and placed upon the market at a minimum cost.

Another object of the invention is to provide means for keeping the saw up to its work without stopping the sawing operation.

To accomplish the above and various other objects, my invention consists essentially of a movable support by which the assembled apparatus can be carried from place to place, of a frame slidably mounted on said support, a slotted bar mounted in said frame and the end of said slotted bar extending down close to the ground, a horizontal guide-way in the frame close to the support, a pitman in said guide-way connected with the lower end of the slotted bar, a saw carried by said pitman, means for oscillating the slotted bar, and means coöperating with the said oscillating means for moving the frame on the support to keep the saw up to its work.

My invention also consists in certain other features of construction, and in the combination and arrangement of the several parts, to be hereinafter fully described and specifically pointed out in the appended claims.

In describing my invention in detail, reference will be had to the accompanying drawings, wherein like characters denote like or corresponding parts throughout the several views, and in which:

Figure 1 is a side view.
Fig. 2 is a plan view.
Fig. 3 is a front view, with parts shown in section on the line 3—3 of Fig. 1.
Fig. 4 is a section on the line 4—4 of Fig. 3.
Fig. 5 is a plan of a detail and
Fig. 6 is a section on the line 6—6 of Fig. 2.

In these figures 1 represents a horizontal frame provided with a track 2. A platform 3 is mounted on said track and this platform carries the frame 4 in which the different parts of the apparatus are mounted. In the upper part of this frame is pivoted a slotted bar 5 provided with a slot 6, in which engages a crank pin 7 mounted on a disk 8. This disk is rotated by means of the shaft 9 and friction wheel 10 with which latter engages a friction wheel 11, operated by the engine 12. The lower end of the slotted bar is secured to a cross-head 13, by means of a link 14. Said cross-head operates in a horizontal slide 15 and is connected by a pitman 16 to the saw 17. The pitman is pivoted to the cross-head at 18 so that said pitman with the saw can be raised to the position shown in dotted lines in Fig. 3.

The engine 12 is mounted on a table 19, pivoted on the platform 3 and this table is swung by the lever 20 and link 21 so as to throw the two friction wheels 10 and 11 into and out of engagement. To provide means for moving the saw into contact with the stump I provide a worm 22 on the shaft 9 which meshes with the gear wheel 23, mounted on the shaft 24 and this shaft 24 carries a sleeve 25 to which is fastened a belt or chain 26 which passes under suitable rollers and is secured to the front of the horizontal frame at 27.

With the saw in raised position, as shown in Fig. 3 and the wheels 10 and 11 out of engagement, horses are hitched to the horizontal frame and the same carried to the stump to be sawed. The saw is then lowered into contact with the stump, the engine started, and the wheels 10 and 11 put into engagement by means of the lever 20, thus through the disk 8 and its crank pin 7 operating the slotted bar the saw is actuated while at the same time the saw is kept up to its work by means of the belt 26 and its operating parts moving the platform toward the front of the horizontal frame.

The link 14 connecting the lower end of the slotted bar to the cross-head acts to reduce vibrations.

By using blocks above and below the saw blade, and being carried by the pitman head, the saw can be adjusted to reciprocate on a level with the ground, or from 1 to 6 inches above the ground, as desired.

If desired, I may place a projection on the horizontal frame to engage with the lever 20, so that the engine 12 is automatically moved out of operative position when the platform carrying the frame reaches a certain position on the horizontal frame.

By using sleeves of different size on the shaft 24, the feed of the saw to its work can be regulated.

For returning the device to its original position on the horizontal frame I provide slides 28 for the bearing 29 of the shaft 9 and the said bearing is raised and lowered by means of a crank shaft 30 secured to said bearing and passing through slots 31 in the slides 28. Said crank shaft is mounted in bearings 32 and is actuated by a lever 33. When the stump is sawed through and it is desired to return the device to the starting point on the horizontal frame the lever 33 is lowered and this causes the crank shaft 30 to raise the bearing 29 and the end of the shaft 9 to throw the worm 22 out of engagement with the gear 23 so the shaft 24 will turn freely on its axle to allow the belt 26 to run off the sleeve 25 as the device moves back to its starting point.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. A stump sawing machine comprising a horizontal frame, a platform movably mounted upon the horizontal frame, a reciprocatory saw mounted upon the platform, a vertical frame mounted upon the platform, means carried by the vertical frame for reciprocating the saw, a drum mounted upon said frame and driven by said operating means, and a cable connected to said drum and the forward end of the horizontal frame for moving the saw up to the work.

2. A stump sawing machine comprising a platform, a reciprocating saw mounted upon the platform, means for reciprocating said saw, an engine having a drive wheel, said engine being pivotally mounted upon the end of the platform, said drive wheel adapted for engagement with the above means, and a lever pivoted intermediate the ends of the platform and having connection with the engine to swing the engine upon the platform for engaging and disengaging the drive wheel with the above means.

3. A stump sawing machine comprising a horizontal frame, a platform movably mounted thereon, a reciprocatory saw mounted upon the platform, a vertical frame mounted upon the platform, means for reciprocating the saw mounted upon the platform, a worm carried by said means, a drum carrying a worm wheel adapted to mesh with aforesaid worm and mounted upon the vertical frame, and a cable secured to said drum and the forward end of the horizontal frame for moving the saw up to the work.

In testimony whereof I affix my signature in presence of two witnesses.

CHARLES J. PEACOCK.

Witnesses:
W. W. BEEDE,
J. C. McFADDEN.

Copies of this patent may be obtained for five cents each, by addressing the "Commissioner of Patents, Washington, D. C."